United States Patent [19]

Pawlowski

[11] 4,315,618

[45] Feb. 16, 1982

[54] MACHINE FOR SPLITTING SLABS BY OXYGEN-CUTTING

[75] Inventor: Jean Pawlowski, Pont de Steendam, France

[73] Assignee: Union Siderurgique du nord et de L'est de la France ("USINOR"), Paris, France

[21] Appl. No.: 142,842

[22] Filed: Apr. 22, 1980

[30] Foreign Application Priority Data

Apr. 27, 1979 [FR] France .................................. 79 10906

[51] Int. Cl.³ .............................................. B23K 7/10
[52] U.S. Cl. ..................................................... 266/69
[58] Field of Search ........................ 266/69, 67; 148/9

[56] References Cited

U.S. PATENT DOCUMENTS 2,809,824 10/1957 Kelso et al. ............................ 266/63
3,001,680 9/1961 Nitkiewicz .............................. 226/15

Primary Examiner—W. Stallard
Attorney, Agent, or Firm—Cushman, Darby & Cushman

[57] ABSTRACT

For splitting a slab by oxyen-cutting, blow-pipes are mounted on a carriage which is free to move in translation along a girder which is part of a bench driven in translation along rails. The plane of symmetry of the carriage is constantly made to coincide with the plane of symmetry of the slab by means of two sensor runners which bear against the sides of the slab. The runners are carried by two pivotal arms mounted on the carriage and interconnected by a kinematic chain whereby these arms are maintained in a relative position which is symmetrical relative to the plane of symmetry of the carriage.

25 Claims, 5 Drawing Figures

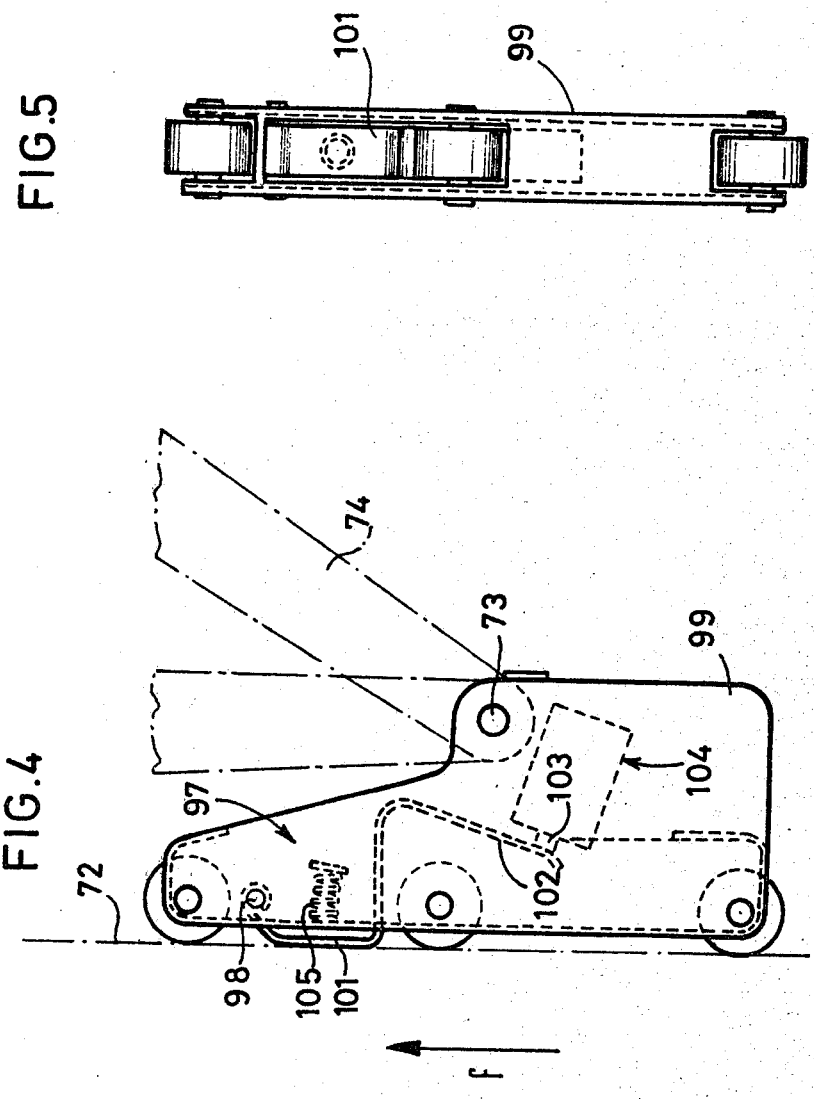

MACHINE FOR SPLITTING SLABS BY OXYGEN-CUTTING

The present invention relates to the splitting of slabs of oxygen-cutting.

Usually, oxygen-cutting machines for effecting straight cuts comprise a bench which directly carries the blow-pipes and moves along a rectilinear runway.

When such a machine is employed for cutting slabs into blooms, the section of which is small relative to their length, the edge blooms are found to bend. This defect is the result of a cutting shrinkage phenomenon well known to boiler makers. In deforming, it so happens that the edge bloom, in bearing against the support for the slab, causes the latter to move and this results in a relative offset of the path of the cut whose effect is to render the edge blooms unsuitable for a subsequent treatment, for example in a girder train.

A physical locking of the slab in a kind of vice may be envisaged, but owing to the dimensions of the blooms, the forces involved could reach such high values that this locking cannot be achieved in practice.

An object of the invention is to provide a machine for splitting slabs by oxygen-cutting which is capable of producing blooms, including the blooms of the two edges, which have satisfactory characteristics as concerns their longitudinal profile and their section.

The invention provides a machine for splitting a slab which freely rests flat on a fixed support, by means of oxygen-cutting blow-pipes carried by a bench which is movable in translation in the direction of cutting the slab, wherein the blow-pipes are mounted on a carriage which is freely movable in translation on a runway carried by the bench in a direction perpendicular to the direction of advance of the bench, self-centering means are provided which comprise in the known manner two sensors which cooperate with the respective sides of the slabs, and said sensors, which are carried by the carriage, have such interconnection that they constantly occupy positions which are symmetrical relative to a vertical plane coinciding with a reference plane of the carriage parallel to the direction of the splitting, said reference plane being preferably a plane of symmetry of the carriage.

With such an arrangement, any variation in the width of the slab or in its position, results in a modification of the position of the sensors and consequently of the carriage until the coincidence of the two planes of symmetry is achieved. Consequently, the group of blow-pipes, whose nozzles are located substantially on a straight line through the sensors, follows the real axis of the slab. The variations in the width of the slab are divided equally between the two end blooms, which is perfectly acceptable.

U.S. Pat. No. 3,001,680 describes a self-centering device for a strip of thin sheet of constant width passing in front of a fixed splitting device. The self-centering is achieved by means of sensor rollers applied against the edges of the strip and carried by arms which, being pivotal about a common vertical fixed axis, do not have a permanent position of symmetry relative to the longitudinal reference axis of the system.

According to a preferred arrangement, the sensors, which are formed by runners which are in rolling or sliding contact with the sides of the slab, are pivotally mounted respectively on two arms of equal length which are pivotally mounted on the carriage at symmetrical points relative to the reference plane, these two arms being interconnected by a kinematic chain which is adapted to maintain them in a relatively symmetrical position and comprises a gear system having two gear wheels of equal diameter rigid with shafts mounting respectively one of the arms and reversing lever which is connected to the other arm by a coupling rod whose articulations define with the mounting shafts of the lever and the other arm an articulated parallelogram structure. The two runners are caused to bear against the sides of the slab by a pneumatic cylinder device which is pivotally mounted on the carriage and whose moving member is pivotally mounted on the reversing lever and which is double-acting so as to permit the separation of the arms in the extreme positions of the bench.

In order to render inoperative the self-centering means at the start and at the end of the splitting travel, i.e. when the sensor runners are not completely in contact with the sides of the slab, the bench comprises means for locking the carriage which comprises a brake capable of being actuated manually or automatically under the effect of a switch subjected to the action of a secondary sensor carried by the runner and normally having a rubbing contact position with the associated side of the slab, corresponding to a release of the brake, and arranged to initiate the application of the brake as soon as this contact ceases.

The invention will be explained merely by way of illustration in the course of the ensuing description with reference to the accompanying drawings in which:

FIGS. 4 and 5 are views, to an enlarged scale, of one of the sensor runners.

Figure 1:
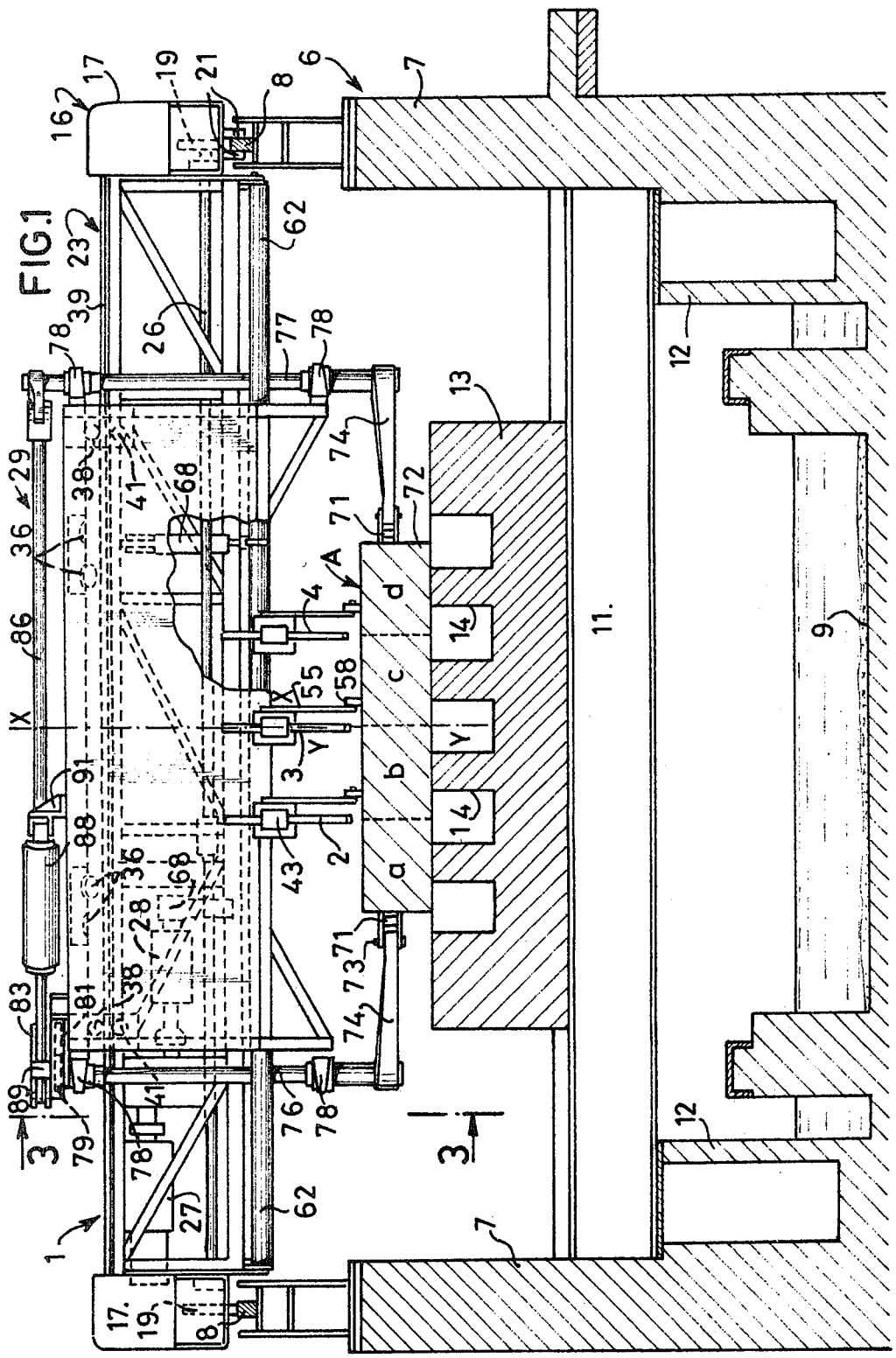
FIG. 1 is a front elevational view of a slab splitting machine also showing in section the underframe supporting the machine.

The machine 1, which carries three oxygen-cutting blow-pipes 2, 3, 4 extending vertically downwardly for splitting a slab A into four blooms a, b, c, d, is supported on a concrete underframe 6 which comprises two parallel vertical walls 7 to the upper part of which two rails 8 are fixed. Constructed between the walls 7, in the lower part, is a pit 9 filled with water and surmounted by spaced transverse girders 11 which bear on supports 12. Each girder 11 carries a parallel-sided comb-shaped block 13 which has recesses 14 facing upwardly with some of which the oxygen-cutting blow-pipes are in alignment, these blow-pipes 2 to 4 cutting the slab A which rests freely flat on the support formed by the assembly of longitudinally spaced blocks 13.

The machine 1 comprises a bench 16 which is movable in longitudinal translation and has in plan a U-shape whose branches 17 are provided in their lower part with rollers 18, 19 having a horizontal axis and bearing on the rails 8. Further, for the purpose of the transverse guiding of the bench, rollers 21 having a vertical axis engage each of the rail 8 of one of the sides. The two branches 17 of the bench 16 are interconnected in the front by a straight girder 23 which forms an overhead crane having four sides in a box-shaped trellis structure formed by section members 24. For the purpose of driving the bench 16, a shaft 26 extends through the girder 23 and is connected to the front rollers 19 and is capable of being selectively coupled to two motors 27, 28 having different speeds so that the bench travels slowly in the cutting direction and rapidly in the return travel. The arrow f designates the direction of cutting.

The blow-pipes 2 to 4 are not directly mounted on the straight girder 23 of the bench 16 but on a carriage 29 which is movable in translation transversely along the girder 23, the frame of this carriage comprising a rectangular box-like structure surrounding the girder 23 and comprising sides 31 to 34 of a trellis structure. The upper side 31 is provided with two pairs of inclined rollers 36, which are guided on the flanges of an L-section member 37 welded to the upper side of the girder 23, and rollers 38 having a horizontal axis and rolling on a rail 39 fixed to the upper side of the girder. An additional guiding is ensured by rollers 41 having a horizontal axis carried by the front vertical side 32 of the carriage and having a rolling contact with the underside of the horizontal flange of an L-section member 42 welded to the adjacent section member 23 of the girder 23.

Each blow-pipe 2, 3, 4 is fixed in a vertical position in a yoke 43 whose branches are connected by links 44, 46 (which form an articulated parallelogram structure having two vertical sides) to the front end 45 of a support arm 47 which is fixed to the lower part of the carriage in a position which may be adjusted in the direction of translation of the carriage. For this purpose, the rear end of the arm 47 is slidable in a slideway 48 which is adjacent to the lower side 33 of the carriage whereas there are mounted on the front end 45 two rollers 49 which have a horizontal axis and are guided along the edge of an upwardly bent edge portion 51 of the horizontal flange of an L-section member 52 whose vertical flange is welded to the front side 32 of the carriage. The support arm 47 may be blocked in position by means of one or more screws 53 carried by the front end 45 of the arm and in contact with the horizontal flange of the L-section member 52.

Each blow-pipe is maintained at the required distance from the slab A by a bearing member 55 in the shape of a downwardly open compass, the apex region of the latter having extending therethrough pins 54, 56 which connect the links 44, 46 to the yoke 43. The branches of the member 55 carry at their end a roller 58 which is in rolling contact with the upper side of the slab.

The upper links 44 are extended rearwardly beyond the pivot pin 59 and form a lever arm 61 on which a downwardly directed force may be exerted for raising the blow-pipes through a roller 62 which extends throughout the length of the girder 23 and is connected, by arms 63, to pivots 64 carried by the front lower section member of the girder 23 and, by tabs 66, to the end pivots of rods 67 of cylinder devices whose body 68 is pivotally mounted on a bracket 69 fixed to the upper side of the girder 23. The extension of the cylinder devices 68 raises the blow-pipes.

The carriage 29 has a vertical plane of symmetry X—X in which is located the centre blow-pipe 3. The other blow-pipes 2, 4 are spaced from the centre blow-pipe a distance equal to one quarter of the nominal width of the slab. The two middle blooms b, c consequently have a constant width. However, owing to variations in the actual width of the slab, the width of the edge blooms a, d cannot be constant. In order to arrange that these variations be divided equally between these edge blooms and that any displacement of the slab on its support have not harmful consequence, the splitting machine according to the invention has self-centering means the purpose of which is to ensure constantly, during the advance of the bench 16 and owing to the fact that the carriage is free to move transversely, that the plane of symmetry XX of the carriage coincides with the plane of symmetry YY of the slab to which may be linked the surface which is the locus of the centre of the planar sections of the slab perpendicular to the direction of advance of the bench.

Figure 2:
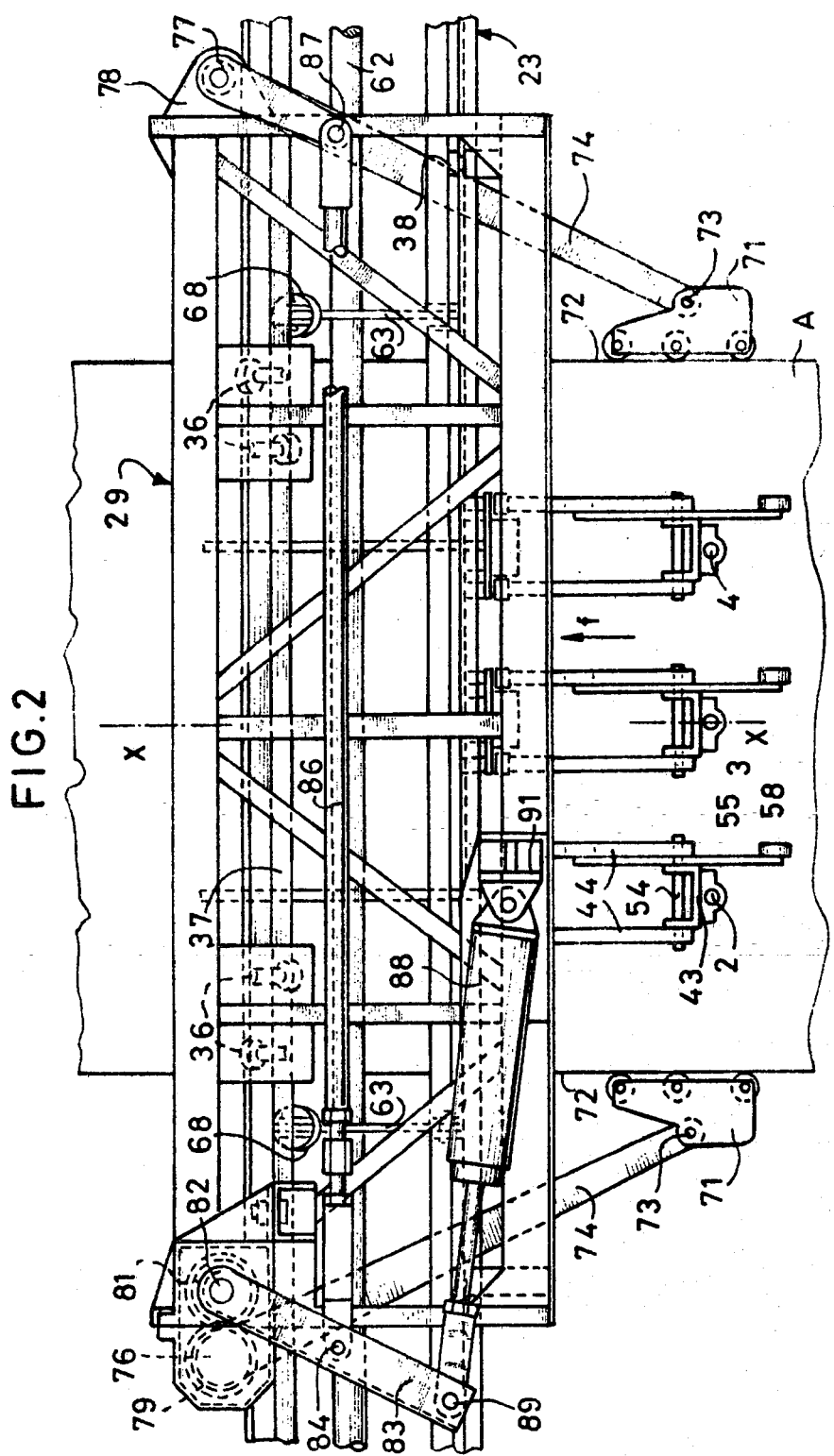
FIG. 2 is a corresponding plan view.

For this purpose, two sensor runners 71 carried by the carriage 29 and disposed symmetrically, are in rolling contact with the respective sides 72 of the slab and are pivotally mounted at 73 on a corresponding end of two arms 74, which are of equal length and are pivotally mounted on the carriage by vertical pins 76, 77 and have therebetween a kinematic connection which ensures that they are maintained in a relative position which is symmetrical relative to the vertical plane XX. Each vertical pin 76 or 77 is journalled in two members 78 fixed to the corresponding end of the carriage and extends upwardly above the structure of the carriage. Fixed on the extension of one of the pins 76, located on the left side of FIGS. 1 and 2, is a gear wheel 79 which is engaged with a gear wheel 81 having the same diameter and fixed on a shaft 82 which is in transverse alignment with the pin 76 and is rigid with one of the ends of a reversing lever 83 which makes with the direction of advance an angle equal to that of the adjacent arm 74 but in the opposite direction. Mid-way of the length of the lever 83 the latter is pivotally mounted by a pin 84 on one of the ends of a coupling rod 86 whose other end is pivotally mounted on the other pivotal arm 74 by means of a pin 87 whose position is such that the elements 82, 84, 77, 87 define an articulated parallelogram structure. The coupling rod 86 is consequently parallel to the direction of translation of the carriage and the two arms 74 remain symmetrical relative to the plane XX.

The runners 71 are made to closely engage the sides of the slab 72 by a double-acting pneumatic cylinder device 88 which is mounted between the end 89 of the lever 83 opposed to the pin 82 and a member 91 fixed to the top of the carriage.

Figure 3:
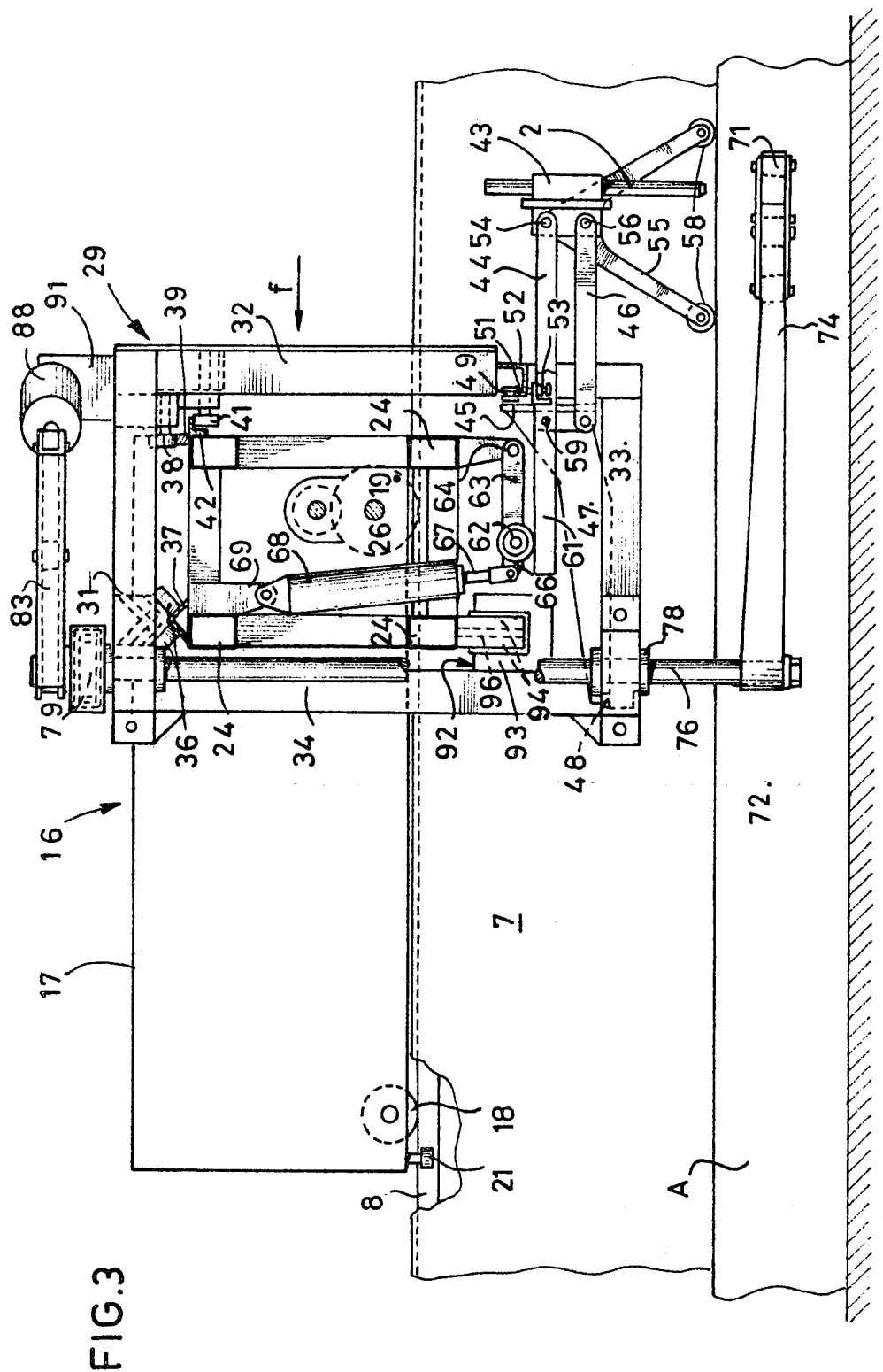
FIG. 3 is a sectional view taken on line 3—3 of FIG. 1.

At the ends of a working travel of the bench 16, both sensor runners 71 may possibly not be in definite contact with the sides 72 of the slab. The carriage 29 should then be made insensitive to the action of the self-centering means. This is the reason why a brake 92, diagrammatically shown in FIG. 3, is provided. This brake comprises a yoke 93 fixed to the side 34 of the carriage 29, between the branches of which yoke jaws 94 may be shifted under the effect of, for example, an electro-hydraulic control for the purpose of exerting braking pressure on a vertical strip 86 rigid with the rear lower section member 24 of the girder 23 of the bench 16. The brake 92 may be actuated manually or automatically in accordance with the position that the runners 71 occupy longitudinally of the ends of the slab.

For the purpose of this automatic actuation, each runner 71 comprises (FIG. 4) a secondary sensor 97 which has a bent strip having one end, pivotally mounted on a pin 98 carried by the sides 99 of the runner, and a straight portion 101 which forms a rubbing element which is biased by a spring 105 into contact with the side of the slab 72 in a position in which the end portion 102, remote from the pin 98, maintains in a depressed condition a knob 103 of a switch 104 so as to ensure the release of the brake 92 and the freedom of movement of the carriage. When the rubbing contact of the sensor 97 ceases, the spring 105 causes the sensor to pivot and releases the knob 103 which modifies the state of the associated circuit and causes the application of the brake and the locking of the carriage.

Preferably, the switch 104 controls not only the braking circuit but also the supply circuit of the pneumatic cylinder device 88 so that when the knob 103 is depressed, the runners 71 are applied against the sides of the slab 72 and when, subsequent to the loss of rubbing contact, the knob resumes its other position, the supply of the cylinder device is reversed and the arms 74 are moved apart.

At the end of the cutting, as soon as one of the two sensors 97 detects the end of the slab, the application of the brake which then occurs prevents any non-controlled reaction of the system and the remaining roughly ten centimeters will be cut under good conditions with no need of intervention on the part of the operator. Moreover, an automatic arrangement may be provided which would stop the machine after a sufficient delay.

At the start of a cutting operation, the arms 74 are open and the brake 92 for the carriage is applied. The operator brings the machine to the starting end of the slab, he releases the brake and closes the arms by means of the cylinder device and thus centres the carriage. After having locked the carriage by means of the brake 92 and separated the arms 74, he causes the machine to move back into a starting position. During the beginning of the cutting operation, the carriage maintains its initial position and as soon as the cutting reaches the point where the slab is within the field of action of the runners, the operator passes to the "automatic" position by actuating the self-centering means. The arms close and, when the secondary sensors 97 both detect the presence of the slab, the carriage brake is released and the normal procedure commences.

The oxygen-cutting clinkers, which are converted into granules in the water of the pit 9, and periodically removed by a scraper (not shown), accumulated and discharged by a grab bucket.

Having now described my invention what I claim as new and desire to secure by Letters Patent is:

1. A machine for splitting a slab, comprising a fixed support on which support the slab lies flat, oxygen-cutting blow-pipes for cutting the slab, a bench which carries the blow-pipes and is movable in translation relative to the support in a direction corresponding to a direction in which the slab is cut, a runway carried by the bench, a carriage which is free to move in translation on the runway in a direction perpendicular to said direction of movement of the bench, self-centering means comprising two sensors cooperative with respective transversely opposed sides of the slab, the sensors being carried by the carriage, and means interconnecting the sensors whereby the sensors constantly occupy positions which are symmetrical relative to a vertical plane which coincides with a vertical reference plane of the carriage and is parallel to the slab-cutting direction.

2. A machine as claimed in claim 1, wherein the vertical reference plane is a plane of symmetry of the carriage.

3. A machine as claimed in claim 1 or 2, wherein the two sensors are disposed in alignment with the blow-pipe nozzles transversely of the carriage.

4. A machine as claimed in claim 1 or 2, wherein the sensor interconnecting means comprise two arms of equal length which are pivotally mounted on the carriage on pivots which are symmetrically disposed relative to said reference plane, each sensor being pivotally mounted on a respective one of the arms, and a kinematic connection between the two arms which ensures that the arms are maintained in a relative position which is symmetrical relative to said vertical reference plane.

5. A machine as claimed in claim 1, wherein the sensors comprise runners which are in sliding contact with said sides of the slab.

6. A machine as claimed in claim 1, wherein the sensors comprise runners which are in rolling contact with said sides of the slab.

7. A machine as claimed in claim 1 or 2, comprising elastically yieldable means for biasing the sensors in contact with said sides of the slab.

8. A machine as claimed in claim 4, wherein the kinematic chain comprises a reversing lever pivotally mounted on the carriage, two interengaged gear wheels rotatably mounted on the carriage and having the same diameter, one gear wheel being rigid with a first of the arms and the other gear wheel being rigid with the reversing lever, a connecting rod pivotally connecting the reversing lever to a second of the arms, the pivotal connections of the connecting rod forming with the pivotal mountings of the two arms an articulated parallelogram structure.

9. A machine as claimed in claim 8, comprising elastically yieldable means for biasing the sensors in contact with said sides of the slab, the elastically yieldable means comprising a pneumatic cylinder device between the carriage and the reversing lever and normally operative to bias the reversing lever in a direction which causes the two sensors to bear against said sides of the slab.

10. A machine as claimed in claim 9, wherein the pneumatic cylinder device is double-acting so as to be capable of moving the arms apart.

11. A machine as claimed in claim 1 or 2, comprising carriage locking means interposed between the bench and the carriage for rendering the self-centering means inoperative.

12. A machine as claimed in claim 11, wherein the locking means comprise a brake which may be actuated manually.

13. A machine as claimed in claim 12, comprising in combination with each sensor a secondary sensor which is normally in contact with the corresponding side of the slab and is connected and arranged to automatically apply the brake as soon as contact with the slab ceases at the end of a cutting travel of the blow-pipes.

14. A machine as claimed in claim 13, wherein the brake is electrically operated as an electric circuit including a switch is connected to the brake for actuating the brake, the switch being associated with the secondary sensor for actuation thereby.

15. A machine as claimed in claim 1, wherein the support comprises a plurality of transverse elements which are spaced apart longitudinally of the machine and are substantially in the shape of a comb and include upwardly open recesses in zones in which the blow-pipes pass.

16. A machine as claimed in claim 1, comprising a pit which is filled with water and receives oxygen-cutting clinkers and is disposed below the carriage.

17. A machine as claimed in claim 1, wherein the carriage has a framework whose section has a general shape of a box and surrounds a transversely extending part of the bench, rails are carried by an upper part of the bench and rollers carried by the carriage are guided by the rails.

18. A machine as claimed in claim 1, comprising two motors having different operating speeds and means for selectively coupling the motors to the bench for driving the bench in translation at two different speeds.

19. The machine as claimed in claim 1, comprising, for supporting each blow-pipe in a vertical position, a mount, a support arm of the carriage, and links forming an articulated parallelogram structure connecting the mount to the support arm, said support arm being adjustably fixed in position along the carriage.

20. A machine as claimed in claim 19, comprising a bearing member rigid with the mount for defining the working position of each blow-pipe relative to the slab.

21. A machine as claimed in claim 19 or 20, comprising a cylinder device pivotally mounted on the bench and having a moving part for raising the blow-pipes, the moving part of the cylinder device being connected to a transverse bar which is connected to the bench and is associated with an extension of some of said links forming a lever arm so as to act on said links.

22. A machine as claimed in claim 3, wherein the sensor interconnecting means comprise two arms of equal length which are pivotally mounted on the carriage on pivots which are symmetrically disposed relative to said reference plane, each sensor being pivotally mounted on a respective one of the arms, and a kinematic connection between the two arms which ensures that the arms are maintained in a relative position which is symmetrical relative to said vertical reference plane.

23. A machine as claimed in claim 22, wherein the kinematic chain comprises a reversing lever pivotally mounted on the carriage, two interengaged gear wheels rotatably mounted on the carriage and having the same diameter, one gear wheel being rigid with a first of the arms and the other gear wheel being rigid with the reversing lever, a connecting rod pivotally connecting the reversing lever to a second of the arms, the pivotal connections of the connecting rod forming with the pivotal mountings of the two arms an articulated parallelogram structure.

24. A machine as claimed in claim 23, comprising elastically yieldable means for biasing the sensors in contact with said sides of the slab, the elastically yieldable means comprising a pneumatic cylinder device between the carriage and the reversing lever and normally operative to bias the reversing lever in a direction which causes the two sensors to bear against said sides of the slab.

25. A machine as claimed in claim 24, wherein the pneumatic cylinder device is double-acting so as to be capable of moving the arms apart.

* * * * *